Patented May 3, 1927.

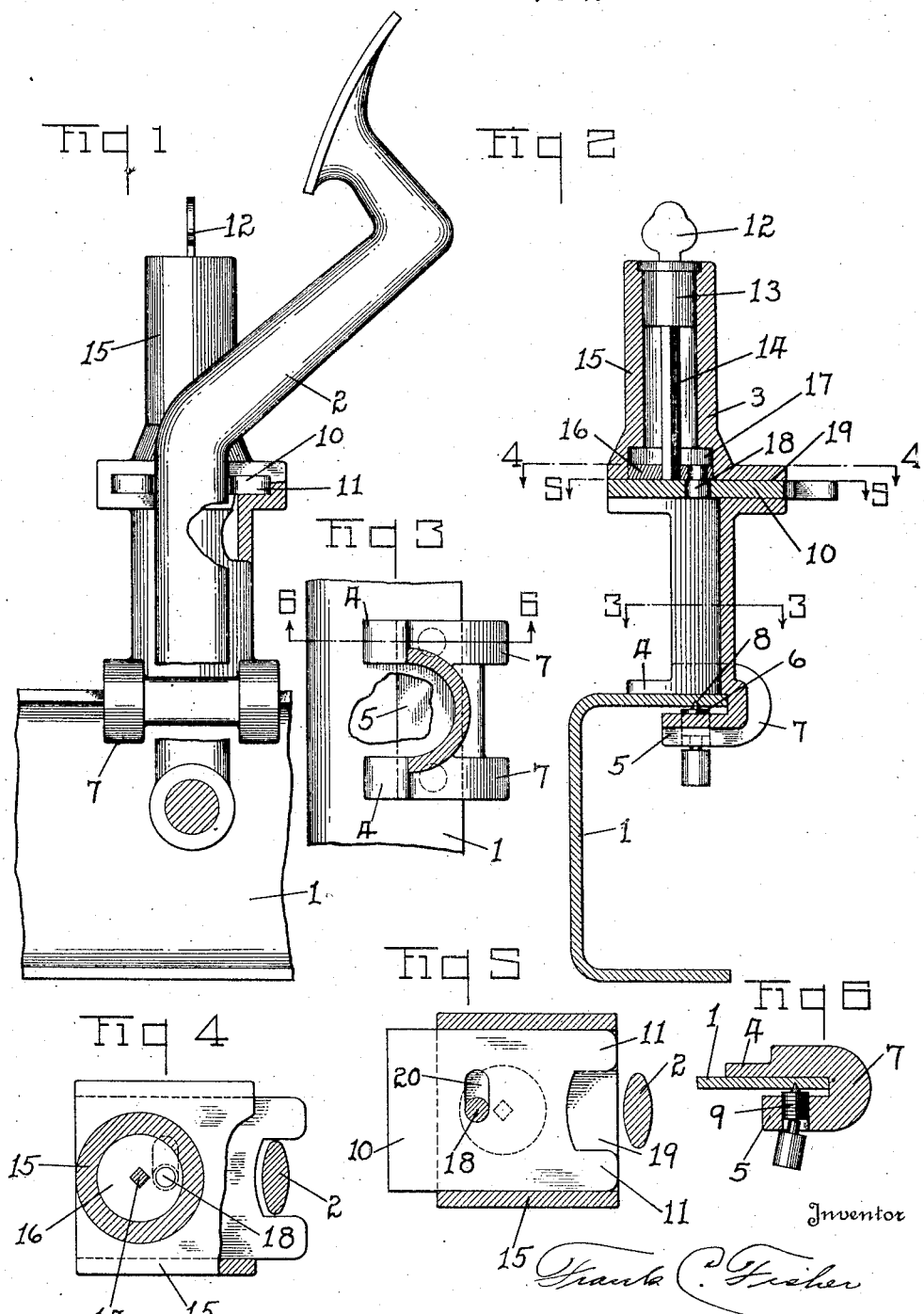

1,627,081

UNITED STATES PATENT OFFICE.

FRANK C. FISHER, OF TOLEDO, OHIO, ASSIGNOR TO THE BRYAN SCREW MACHINE PRODUCTS COMPANY, OF BRYAN, OHIO, A CORPORATION OF OHIO.

AUTOMOBILE LOCK.

Application filed October 17, 1924. Serial No. 744,115.

My invention has for its object to provide an efficient automobile lock, particularly designed for locking the planetary gear of a Ford automobile, that may be made at a low cost of production and may be easily installed and yet permanently fixed to prevent removal of the lock. The preferred form of locks that embody my invention have means for permanently securing them to the chassis frames of automobiles and are provided with slidable fork members that are adapted to engage the speed pedals when the pedals are at their neutral points.

The invention may be contained in structures of different forms and to illustrate a practical application of the invention I have selected a lock containing the invention and shall describe it hereinafter. The lock selected for purposes of illustration is shown in the accompanying drawing.

Figure 1 illustrates a side view of the lock and the lever which it locks, a part being shown broken away for the purpose of showing its construction. Figure 2 illustrates a vertical sectional view taken through the lock and the side bar of the automobile frame. Figure 3 is a view of a section taken on the plane indicated by the line 3—3 of Figure 2. Figure 4 is a view of a section taken on the plane indicated by the line 4—4 of Figure 2. Figure 5 is a view of a section taken on the plane indicated by the line 5—5 of Figure 2. Figure 6 is a sectional view taken on the plane indicated by the line 6—6 of Figure 3.

The lock embodying my invention is secured to the chassis frame. As shown in the drawing, it is secured to the channeled side bar 1 of the frame and beside the speed pedal 2, which, as is well known, is pivotally supported in proximity to the left side bar of the chassis frame of a Ford automobile.

The lock 3 is provided with a pair of lips 4 and 5 that are spaced apart to receive a part of the chassis frame. As shown in the drawing, the lips may be located on opposite sides of the upper side portion of the channeled bar 1 and the lock 3 may be secured to the channeled bar 1 by means of stud bolts 6. The lock 3 may be provided with reinforcing ribs 7 that are bored and adapted to receive the bolts 6. The bolts 6 may be provided with key ends or points 8 that will penetrate the metal of the channeled bar and thus securely key or fasten the lock 3 in position. The stud bolts 6 are formed of a weakened portion of such a character that will withstand sufficient strain to cause the bolts to securely fasten the lock 3 in position on the channeled bar 1 when the bolts are rotated to screw them into the lower lip 5, but upon continued rotation the bolts will break off within the enlarged reinforcing bosses or ribs 7, as shown in Figure 6. This will thus locate the portion 9 of the stud bolt well within the boss 7 without any head, whereby it cannot be engaged by a tool for the purpose of loosening the stud. Thus the lock will be permanently secured to the frame of the automobile.

The lock 3 extends vertically upward from the frame of the automobile to a height such that its upper end will be flush or slightly above the floor boards of the automobile and so that the locking bolt may secure the pedal at a point sufficiently remote from its axis of rotation to reduce the leverage of the pedal on the locking bolt. The locking bolt is in the form of a forked plate 10 having the prongs 11 that are so disposed that when the plate 10 is in its locking position the prongs 11 will be located on opposite sides of the shank of the pedal 2 and thus prevent either forward or rearward movement of the pedal, as shown in Figures 1 and 4. The lock is preferably so disposed as to secure the pedal in its neutral position with reference to high and low speed clutch connections. Thus movement of the car will be prevented in a forward direction, the other two pedals of the Ford automobile being the reverse pedal and the brake pedal.

The locking plate 10 is operated by means of a key 12 which is connected through an ordinary lock barrel 13 to a rod 14. The rod 14 is connected to the barrel 13 and so as to be rotated when the key 12 is rotated. The barrel 13 and the rod 14 are located within a shell 15 of the lock. A disc 16 is located in the end of the shell and is keyed to the rod 14. The rod 14 may have a square end for causing rotative or oscillating movements of the disc 16. The disc 16 is located in a cylindrical socket or recess 17 formed in the lower part of the shell 15 and is provided with an eccentrically located pin 18, which extends downward into a slot 19 having a size sufficient to receive the locking plate 10 and to permit sliding movements of the plate 10 within the shell 15. The socket 17 has a depth sufficient to permit the disc 16 to be moved axially to permit the plate 10 to be slid into the shell 15, notwithstanding the protruding pin 18. The plate 10 is provided with a slot 20 for receiving the end of the pin 18 when the disc 16 is moved to the bottom of the socket 17. When, therefore, the disc 16 is rotated 180 degrees, the plate 10 will be moved between its extreme positions, one of which is the locking position for engaging the shank of the pedal 2 and the other is the unlocking position, as shown in Figures 4 and 5. Thus the pedal may be readily locked in its neutral position or may be readily unlocked by one having the key 12. Thus by my invention I have provided an attractive and efficient lock for Ford automobiles.

I claim:—

In an automobile lever lock a shell having a pair of lips, the automobile having a channel chassis side bar, one of the flanges fitting between the lips of the shell, one of the lips having a pair of threaded openings, bolts having threaded portions, the threaded portions of the bolts having a length such that when it is threaded into the openings and so as to engage the flange of the side bar, the outer end of the threaded portion will be located within the lip having the openings, the bolts having weakened portions at the ends of the threaded portions and breakable when subjected to a rotative strain beyond a point for suitably clamping the bolts against the side of the flange.

In testimony whereof I have hereunto signed my name to this specification.

FRANK C. FISHER.